United States Patent [19]

DuFresne

[11] 3,951,339

[45] Apr. 20, 1976

[54] LIQUID DISTRIBUTION SYSTEM FOR IRRIGATION AND THE LIKE

[76] Inventor: Armand F. DuFresne, 901 Iva Court, Cambria, Calif. 93428

[22] Filed: June 10, 1975

[21] Appl. No.: 585,562

[52] U.S. Cl. ............................. 239/66; 137/487.5; 137/624.18; 239/70
[51] Int. Cl.² .................. A01G 25/16; F17D 3/00
[58] Field of Search ............................. 239/66–71; 137/486–487.5, 551, 554, 557, 624.11, 624.12, 624.18, 624.2, 624.27

[56] References Cited
UNITED STATES PATENTS

| | | | |
|---|---|---|---|
| 3,599,867 | 8/1971 | Griswold et al. | 239/70 X |
| 3,665,945 | 5/1972 | Ottenstein | 137/487.5 X |

Primary Examiner—John J. Love
Assistant Examiner—Andres Kashnikow
Attorney, Agent, or Firm—Christie, Parker & Hale

[57] ABSTRACT

An electrically controlled liquid distribution system for irrigation and the like comprises a central sequencing control station for controlling a remote valve station. The valve station provides local fault-sensing feedback control over actuation current supplied to a remote control valve therein. Conductor means, preferably comprising a single pair of conductors, connect the central station to the remote valve station. In one embodiment, the feedback control results in a change in current level flowing in the conductors after the remote control valve opens, and circuitry in the central station detects this change in current level to control an indicator.

11 Claims, 3 Drawing Figures

LIQUID DISTRIBUTION SYSTEM FOR IRRIGATION AND THE LIKE

BACKGROUND OF THE INVENTION

This invention relates to liquid distribution systems used for irrigation and like purposes.

Large scale irrigation systems for golf courses, cemeteries and the like spread out over a vast area. For example, a sprinkler head in one piping path in the system can be a mile or more away from another sprinkler head in another piping path in the system.

In the past, electrical control systems have been developed for controlling the overall operation of such large scale irrigation systems. In such an electrically controlled irrigation system, there are a plurality of piping paths each including its own electrically actuated remote control valve. A central sequencing control station programs the operation of the system by sequentially providing to each remote control valve, during a timed interval, a command voltage. The amount of electrical wiring needed to interconnect the central station and the various remote control valves is considerable. The material cost and the labor expenses incident to laying this wiring over stretches of a mile or more is a significant factor in the cost of the system.

Such complex systems are inevitably prone to a variety of types of faults, particularly because most of the system is outdoors and exposed to a variety of contaminants. For example, sprinkler heads are sometimes clogged by insects or other debris. Occasionally, cracks develop in the piping paths downstream of the remote control valves and thus flooding ensues adjacent the cracks when the remote control valve is held open. The remote control valves themselves are failure-prone. Sometimes, they stick closed notwithstanding the receipt of actuation current. This results in a lack of proper irrigation when the failure goes unnoticed. And, because of the large distances involved, operating personnel at the central station frequently will not be within viewing distance of the area where the fault occurs. On the other hand, sometimes the valves stick open notwithstanding the termination of actuating current. This leads to excess watering of the area where this fault occurs.

Owing to the above-mentioned cost factors relating to the wiring, it is undesirable to lay separate wires between the central station and the various remote valves for purposes of carrying fault-indication signals.

SUMMARY OF THE INVENTION

In an electrically controlled liquid distribution system of this invention, there is provided a central sequencing control station including circuit means for providing a command voltage during timed intervals. The liquid is distributed by means including a piping path having an upstream side and a downstream side. A valve station is located in the piping path at a remote distance from the central station.

The valve station includes control voltage receiving means, a remote control valve having an impedance therein, and a network having a network input coupled to the control voltage receiving means and a network output loaded by the impedance of the remote control valve. When the remote control valve is properly functioning, it is actuated in response to a turn-on level of current supplied to its impedance from the network.

Conductor means connect the circuit means in the central station to the command voltage receiving means. In some cases it may be possible to employ a single interconnecting wire and to use the earth as a common for the central station and the valve station. In most cases, however, it is preferable to employ a pair of conductors for interconnecting the central station and the valve station.

The network in the valve station includes an electrical switching device having open and closed operating conditions. In one embodiment, this electrical switching device is part of a transducer means such as a pressure switch or a flow switch. In another embodiment, it is an electronic switch having a control signal input for receiving a gating control signal that is affected by feedback from such a transducer means. In each embodiment, the loaded network of which the electrical switching device is a part defines a transadmittance (i.e., its output current per unit input voltage characteristic) that is controlled in accordance with the operating condition of the electrical switching device. The transducer means is responsive to the liquid in the piping path on the downstream side of the remote control valve so as to control the switching device to provide local fault-sensing feedback control over the current flowing through the impedance of the remote control valve.

In the above-mentioned embodiment in which a transducer switch serves as the electrical switching device, the network preferably comprises a parallel circuit including a current-limiting impedance and the switching device. This parallel circuit is connected in series with one of the single pair of conductors and with the impedance of the remote control valve. Thus, the transadmittance of the loaded network equals the reciprocal of the impedance of the load (i.e., the impedance of the remote control valve) when the switch is closed, and equals the smaller value given by the reciprocal of the sum of the two series connected impedances when the switch is open. Accordingly, the level of current drawn from the circuit means in the central station decreases when the switch opens. In this embodiment, the central station circuit means includes means for detecting this change in current and an indicator controlled by the detecting means. Thus, operating personnel at the central station are apprised by the indicator of faults occurring in the system at remote areas, and yet separate fault-signal carrying wires are not required.

The above-mentioned embodiment in which an electronic switch is employed in the network has particular advantages with respect to avoiding flooding. Thus, a pressure switch positioned in the downstream side of the piping path will not be operated when the pressure does not build up to a predetermined value. This would occur for example if there is a break in the pipe and the liquid pours out through the break at high flow rate and a correspondingly reduced pressure head. In this embodiment, a timing circuit means is provided for producing a gating control signal for the electronic switch. In the event that the pressure switch does not operate after the remote control valve is actuated, the timing circuit means, in accordance with the operating condition of the pressure switch, terminates the gating control signal. Again, this embodiment also provides a safety feature without the need for separate wiring spanning the long distances involved between the central station and the remote station.

DETAILED DESCRIPTION

Figure 1:
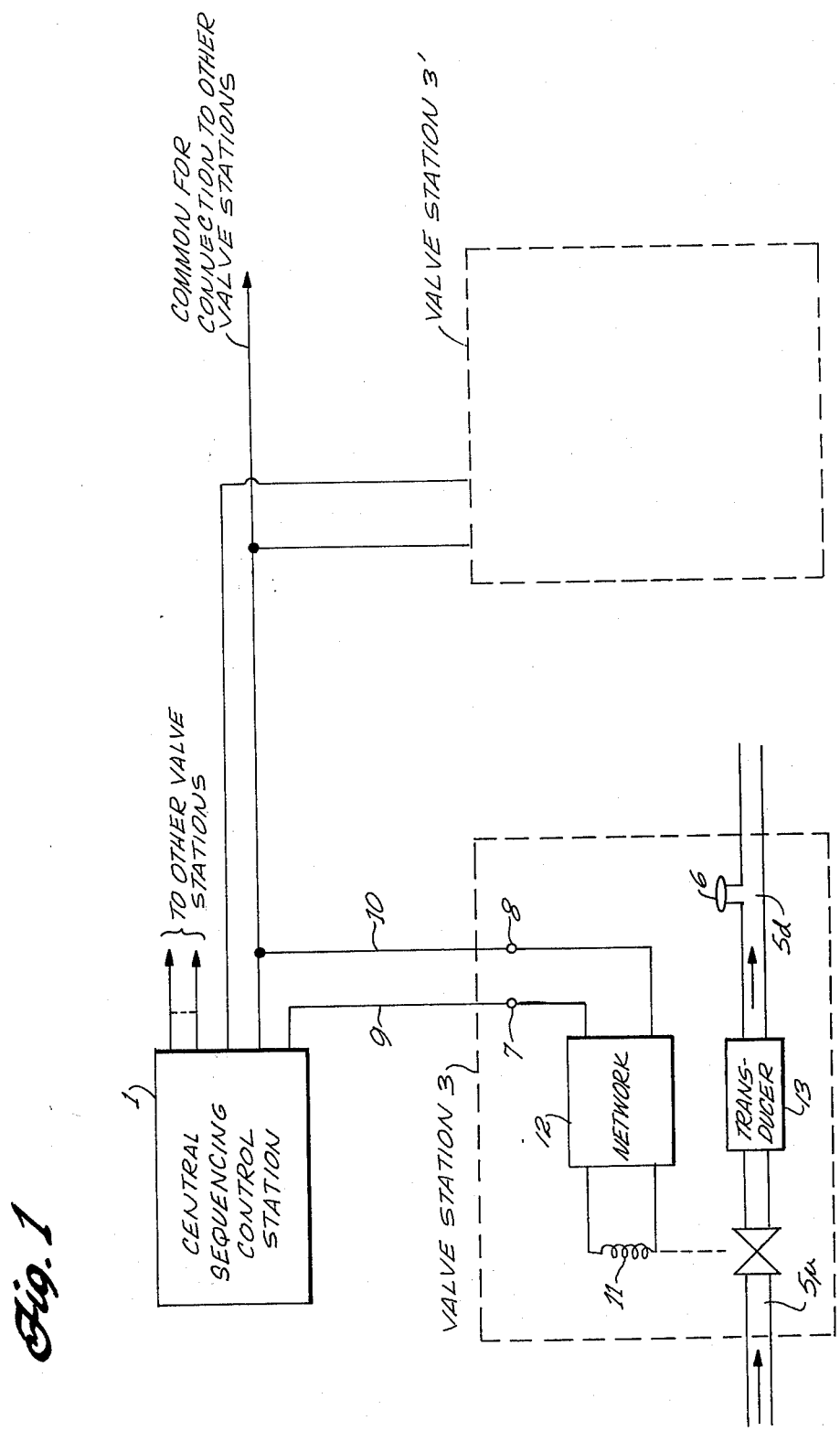
FIG. 1 is a general block diagram illustrating the interconnection of a central sequencing control station and a plurality of valve stations in an irrigation system embodying the invention.

With reference to FIG. 1, an electrically controlled liquid distribution system for irrigation and like purposes includes a central sequencing and control station 1 and a plurality of valve stations 3, 3', etc., each located at a remote distance from the central station.

The liquid is distributed by means including a piping path having an upstream side $5u$ and a downstream side $5d$ where one or more sprinkler heads 6 are located. The valve station 3 comprises command voltage receiving means (terminals 7 and 8). A single pair of conductors 9 and 10 connect the terminals 7 and 8 to the central station. The valve station 3 further includes an electrically actuated remote control valve having an impedance 11 therein. A network 12 in the valve station has a network input coupled to the terminals 7 and 8 and has a network output loaded by the impedance 11. When the remote control valve is properly functioning, it is actuated in response to a turn-on level of current flowing through its impedance. This current is supplied thereto by the network 12 immediately upon receipt of a command voltage from the central station.

The network 12 includes an electrical switching device (not shown in FIG. 1) having open and closed operating conditions. The operating condition of this switching device is controlled by a transducer means 13 that is responsive to the liquid in the piping path $5d$. The loaded network 12 of which the electrical switching device is a part defines a transadmittance that is controlled in accordance with the operating condition of the electrical switching device. It will be appreciated from the foregoing that a local feedback loop is provided. That is, how much current is supplied to the impedance 11 of the remote control valve is not completely determined by the input command voltage. Instead, information gained from the downstream sensing by the transducer means is also used to control how much, if any, current is to be supplied to the valve impedance. As is more fully developed below in connection with the descriptions of FIGS. 2 and 3, this feedback is advantageous in connection with the detection of faults.

Figure 2:
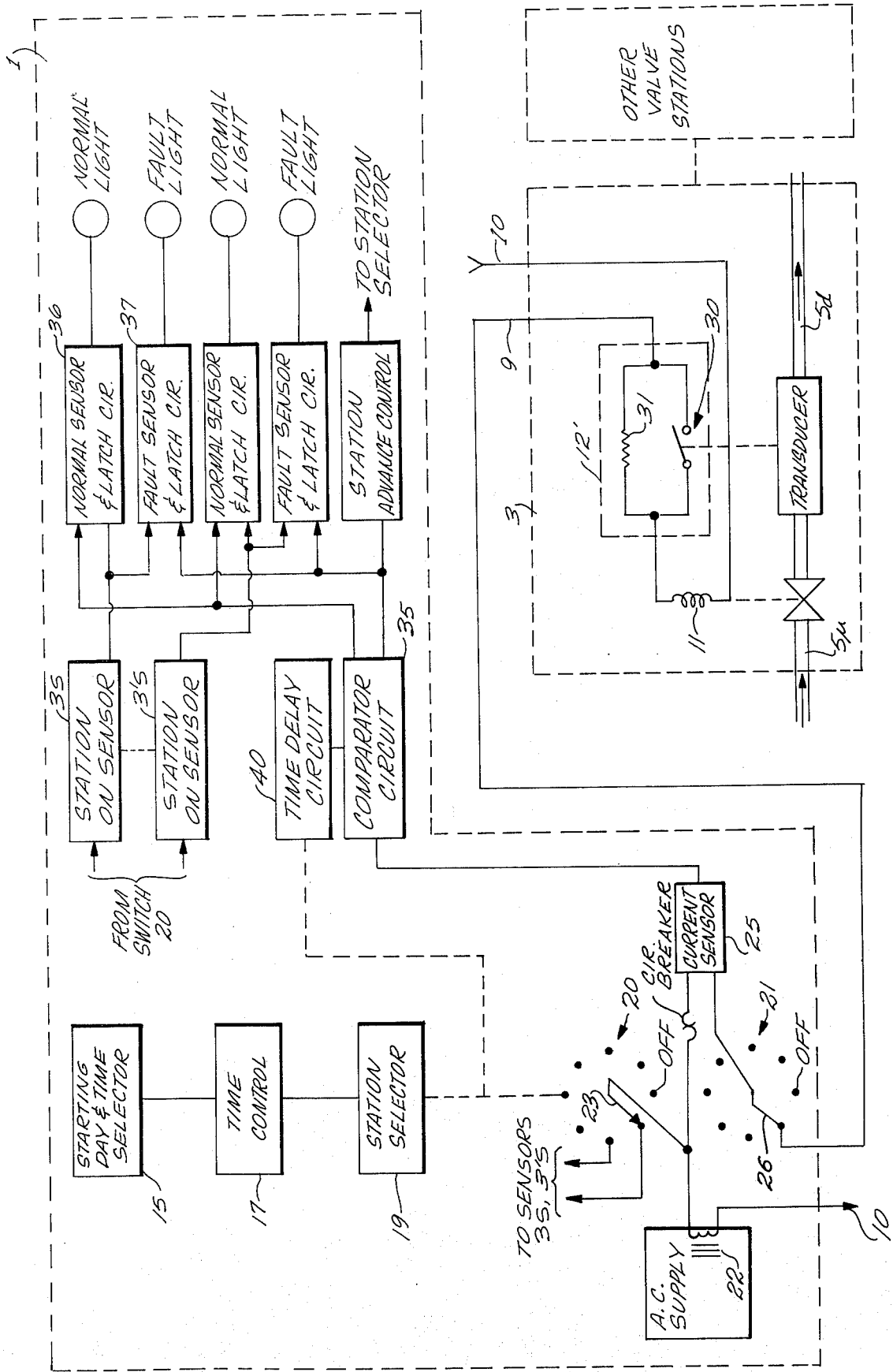
FIG. 2 is a block and schematic diagram of a first embodiment of the invention in which operating conditions of remote valve stations are indicated in the central station.

In the block diagram of FIG. 2, various sub-blocks depict the general organization of the central station 1 which in most respects is conventionally constructed. The central station sequentially commands various valve stations with the basic timing reference being determined by time selector 15, and time control 17. A station selector 19 responds to the time control 17 in conventional manner to sequentially step a stepping switch having ganged rotary switches 20 and 21. Means comprising a valve transformer 22 supply an a.c. voltage to the wiper arm 23 of rotary switch 20. This a.c. voltage is also coupled through a current sensor 25 to the wiper arm 26 of the rotary switch 21. In the depicted positions of the rotary switches, valve station 3 is being selected. Thus, a command voltage is applied across the conductors 9 and 10 that go to the valve station 3. It will be appreciated that stepping of the stepping switch to sequential positions will sequentially select other remote valve stations 3', etc., and then turn the system off when the wiper arms 20 and 21 reach their OFF positions. As each valve station is selected through the operation of the rotary switch 21, a corresponding station on sensor 3S, 3'S, etc. is selected through the operation of the rotary switch 20. Each of these sensors in turn provide a gating control signal to circuitry for selectively energizing either a Normal light or a Fault light for indicating operating conditions with respect to the various valve stations.

In FIG. 2, the network in the valve station which is loaded by the valve impedance is shown in dashed block 12'. The network comprises a parallel circuit that is connected in series with the conductor 9 and with the valve impedance. This parallel circuit comprises transducer switch 30 and current-limiting impedance 31. Under normal operating conditions, the remote valve will properly function, and there are no faults such as cracks on the downstream side of the remote control valve. Under these normal conditions, the transducer switch 30 is closed prior to the receipt of the command voltage, and, after the valve is actuated, the transducer switch 30 opens. A pressure switch for performing this function is commercially available from Valcon, and is sold under the model number 1030.

The amount of current that flows through the valve impedance is determined by the ratio of the voltage output of the transformer to the loop impedance. With the transducer switch being closed the current-limiting impedance 31 is shorted out of this loop impedance. Thus, the actuation current for the valve is initially at a relatively high level sufficient to turn on the valve. Under normal conditions, the opening of the valve results in a flow of liquid under pressure on the downstream side of the valve. The transducer means responds thereto to open the transducer switch. Consequently, the loop impedance is increased because the current-limiting impedance 31 is no longer shorted out, and the actuation current is thereby reduced to a lower level which is still sufficient to hold the valve open. The current sensor 25 detects this drop in current. A conventional comparator circuit 35 is responsive to the current sensor to provide a gating control signal to circuit 36 when such a change in current is sensed, and to provide a gating control signal to circuit 37 when no such change in current is sensed. The circuit 36 is a conventional latch circuit that energizes the Normal light when it receives both the gating control signal from the Station On sensor and the gating control signal from the comparator circuit. The circuit 37 provides the same function with respect to the Fault light. To ensure that the comparison is effected after there has been a sufficient time lapse for downstream conditions to stabilize, a conventional time delay circuit 40 controls the comparator. As to the current sensor 25, a variety of known circuits are suitable for performing its function, the simplest of which is a current sensing impedance across which is developed a voltage proportional to the current flowing therethrough. It will be appreciated that with this embodiment, operating personnel at the central station are apprised by the indicators of faults occurring in the system at remote areas, and yet separate fault-signal carrying wires are not required. Moreover, the fault-indicating gating control signal provided by the comparator circuit can also be used for station advance control as indicated in FIG. 2.

Figure 3:
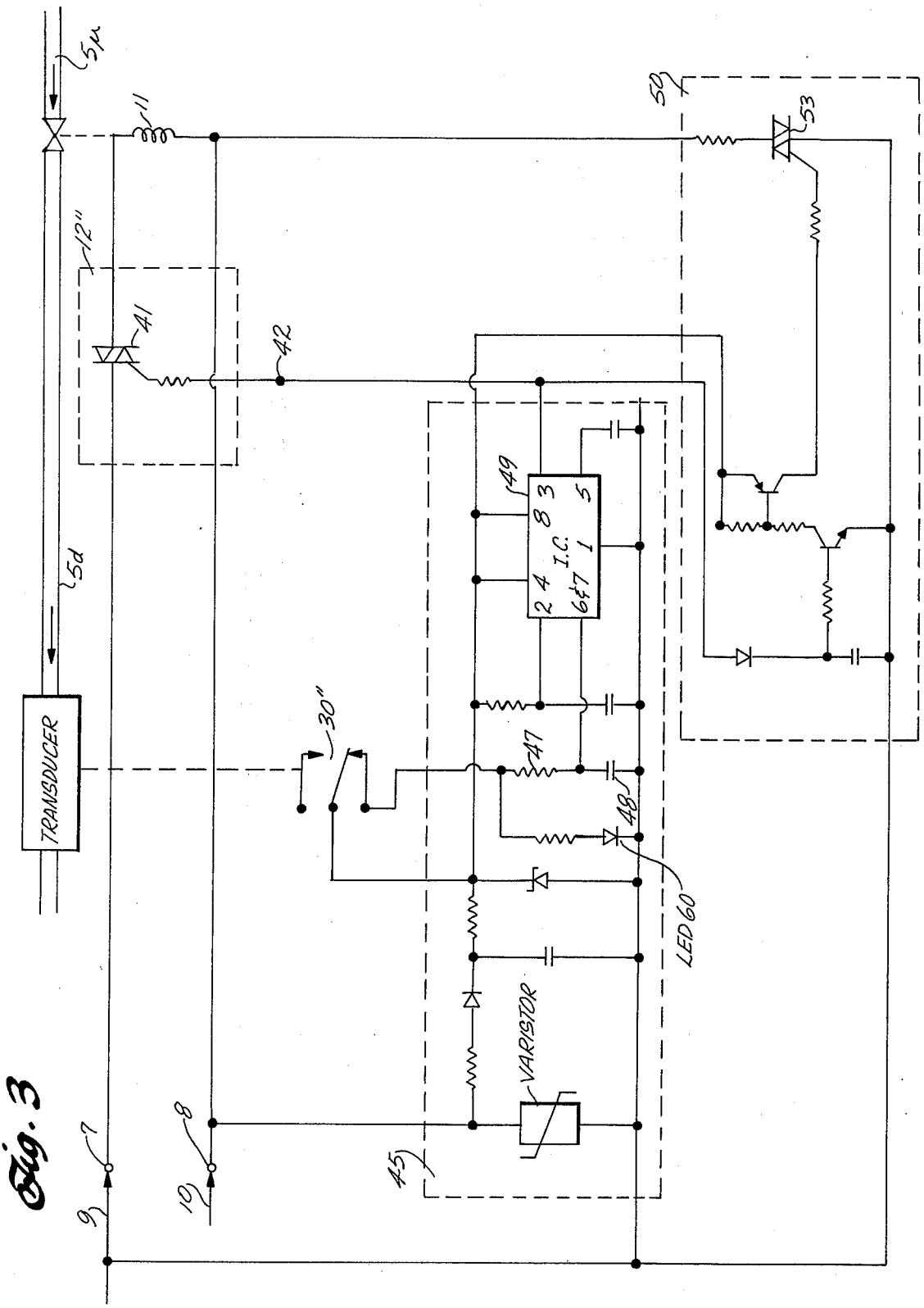
FIG. 3 is a block and schematic diagram illustrating the preferred arrangement of a valve station in a second embodiment of the invention.

FIG. 3 shows a block and schematic diagram of the preferred arrangement of a valve station according to a second embodiment of the invention. In FIG. 3, the network which is loaded by the valve impedance is shown in dashed block 12''. The network comprises an electronic switch 41 connected in series with the conductor 9 and with the valve impedance 11. The electronic switch has a control signal input 42. Preferably, a triac is used as the electronic switch. In response to a gating control signal applied to its input 42, the electronic switch switches from an open to a closed operating condition thereby to conduct a turn-on level of current to the valve impedance 11. Timing circuit means shown within dashed block 45 supplies this gating control signal. The timing circuit means receives its operating power via the conductors 9 and 10. Immediately upon receipt of this operating power, it applies the gating control signal to cause the electronic switch to turn on. Whether or not it will continue to do so is controlled by a transducer switch 30'' that is positioned to respond to the liquid in the downstream side of the remote control valve. Under normal conditions, the transducer switch 30'' opens after the valve is actuated. The opening of the transducer switch disables an R-C timing network comprising resistor 47 and capacitor 48. An integrated circuit 49 of the type sold under the designation MC 1455 P1 is connected to respond to the capacitor voltage across capacitor 48. With the transducer switch being open, the capacitor voltage does not charge up to a threshold voltage sufficient to trigger the integrated circuit 49. In operation then the integrated circuit 49 immediately applies the gating control signal to the electronic switch upon receipt of the command voltage and continues to do so if the transducer switch 30'' opens. On the other hand, if the transducer switch 30'' remains closed, as when a fault occurs, the capacitor voltage charges up to the threshold level, and the integrated circuit 49 terminates the gating control signal. Thus, in the even a fault is sensed, feedback is provided to turn off the supply of current through the electronic switch 41 to the valve impedance. As to the remaining circuitry shown within the timing circuit means 45, it will be appreciated that this circuitry provides rectification and smoothing functions for providing direct current operating power.

An important preferred feature of this embodiment resides in anti-stick circuit shown within dashed block 50. By way of background, it has been found that some remote control valves tend to stick open even though actuation current therefor is terminated. It has further been found that such sticking occurs when actuation current is abruptly removed and does not occur when actuation current is removed more slowly or in stages. The anti-stick circuit is directed to providing a control whereby the actuation current is reduced in stages. As to construction, there is a series circuit comprising resistor 51 and triac 53 with this series circuit being connected in parallel with the electronic switch 41. A conventional timing circuit is provided to supply the gating control signal to the triac 53 such that the triac 53 remains on for an interval of time after the electronic switch 41 turns off. Owing to the current-limiting provided by the resistor 51, the current is at a lower level during this interval. Then, when the triac 53 turns off, no further current is supplied to the valve impedance. To assist maintenance personnel, there is provided a light-emitting diode 60 for providing a visual indication as to the operating condition of the valve station.

What is claimed is:

1. An electrically controlled liquid distribution system comprising:
   a central sequencing control station including circuit means for providing a command voltage during timed intervals;
   means for distributing the liquid including a piping path having an upstream side and a downstream side, the piping path including a valve station located at a remote distance from the central station;
   the valve station including control voltage receiving means, a remote control valve having an impedance therein, and a network having a network input coupled to the control voltage receiving means and a network output loaded by the impedance of the remote control valve; the remote control valve, when properly functioning, being actuated in response to a turn-on level of current being supplied from the network to flow through the impedance of the remote control valve;
   conductor means for connecting the circuit means in the central station to the command voltage receiving means;
   the network including an electrical switching device having open and closed operating conditions, and the loaded network defining a transadmittance that is controlled in accordance with the operating condition of the electrical switching device; and
   the valve station further including transducer means responsive to the liquid in the piping path on the downstream side of the remote control valve for controlling the switching device to provide local fault-sensing feedback control over the current flowing through the impedance of the remote control valve.

2. The system of claim 1 wherein the conductor means comprises a single pair of conductors; wherein the network comprises a parallel circuit including a current-limiting impedance and the switching device, the parallel circuit being connected in series with one of the single pair of conductors and with the impedance of the remote control valve, and wherein the circuit means in the central station includes means for detecting a change in current flowing to the valve station resulting from the switching device switching from closed to open operating conditions.

3. The system of claim 2 wherin the means for detecting comprises a current-sensing impedance across which there is a change in voltage in response to said change in current; and wherein the central station further comprises indicating means responsive to the voltage across the current-sensing impedance for visually displaying a fault indication.

4. The system of claim 1 wherein said electrical switching device comprises an electronic switch connected in series with the impedance of the remote control valve, the electronic switch having a control signal input; and wherein the transducing means comprises a pressure switch positioned in the piping path on the downstream side of the remote control valve, and timing circuit means controlled by the pressure switch for supplying a control signal to the electronic switch.

5. The system of claim 4 wherein the circuit means in the central station provides an alternating-current command voltage, and wherein the electronic switch comprises a triac.

6. The system of claim 1 wherein the transducer means includes a flow switch positioned on the downstream side of the remote control valve.

7. An electrically controlled liquid distribution system comprising:
- a central sequencing control station including circuit means for providing a command voltage during timed intervals;
- means for distributing the liquid including a piping path having an upstream side and a downstream side, the piping path including a valve station located at a remote distance from the central station;
- the valve station including a remote control valve having an impedance therein, the remote control valve, when functioning properly, opening in response to a turn-on level of current flowing through its impedance and remaining open so long as a lower holding level of current flows through its impedance;
- a single pair of conductors connecting the circuit means in the central station to the valve station;
- the valve station further including a parallel circuit comprising a switch and a current limiting impedance; the parallel circuit being connected in series with one of the conductors and with the impedance of the remote control valve, the switch having a closed condition of operation whereby the current-limiting impedance is shorted out and the command voltage causes the turn-on level of current to flow through the impedance of the remote control valve, the switch having an open condition of operation whereby the current-limiting impedance limits the current flowing through the impedance of the remote control valve to the holding level;
- the valve station further including transducer means positioned in the piping path on the downstream side of the remote control valve for controlling the operating condition of the switch to provide local fault-sensing feedback control over the current flowing through the impedance of the remote control valve; and
- the circuit means in the central station further including means for detecting a change in current flowing to the valve station.

8. The system of claim 7 wherein the means for detecting comprises a current-sensing impedance connected in series with one of the pair of conductors; and wherein the central station further includes indicating means responsive to the voltage developed across the current-sensing impedance for visually displaying a fault indication.

9. The system of claim 8 wherein the downstream side of the piping path includes a sprinkler head; and wherein the transducing means includes a flow switch whose operating condition corresponds to whether the flow of liquid through the sprinkler head falls within a predetermined range.

10. An electrically controlled liquid distribution system comprising:
- a central sequencing control station including circuit means for providing a command voltage during timed intervals;
- means for distributing the liquid including a piping path having an upstream side and a downstream side, the piping path including a valve station located at a remote distance from the central station;
- the valve station including a remote control valve having an impedance therein, the remote control valve, when functioning properly, opening in response to a turn-on level of current flowing through its impedance;
- a single pair of conductors connecting the circuit means in the central station to the valve station;
- the valve station further including a transducer switch; an electronic switch connected in series with one of the conductors and with the impedance of the remote control valve, the electronic switch having a control signal input and being responsive to a gating control signal applied to its control signal input to switch from an open to a closed operating condition and thereby conduct a turn-on level of current to the impedance in the remote control valve; and timing circuit means for supplying the gating control signal, the timing circuit means receiving operating power from the central station via the single pair of conductors and providing the gating control signal to cause the electronic switch to switch first to its closed operating condition, the timing circuit including means responsive to the transducer switch for terminating the gating control signal after a predetermined delay interval in the event that the transducer switch is not operated; and wherein
- the transducer switch is positioned to respond to the liquid in the piping path on the downstream side of the remote control valve so as to provide local faultsensing feedback control over the current flowing through the impedance of the remote control valve.

11. The system of claim 10 and further comprising circuit means for supplying current to the impedance of the remote control valve for a timed interval after the termination of the gating control signal so as to reduce in states the total current flowing therethrough.

* * * * *